July 5, 1949.
G. A. SAALINGER
2,475,555
DEVICE FOR LOCKING THE STRIP-TIGHTENING
SHAFT OF BUFFING WHEELS OR THE LIKE
Filed June 8, 1948
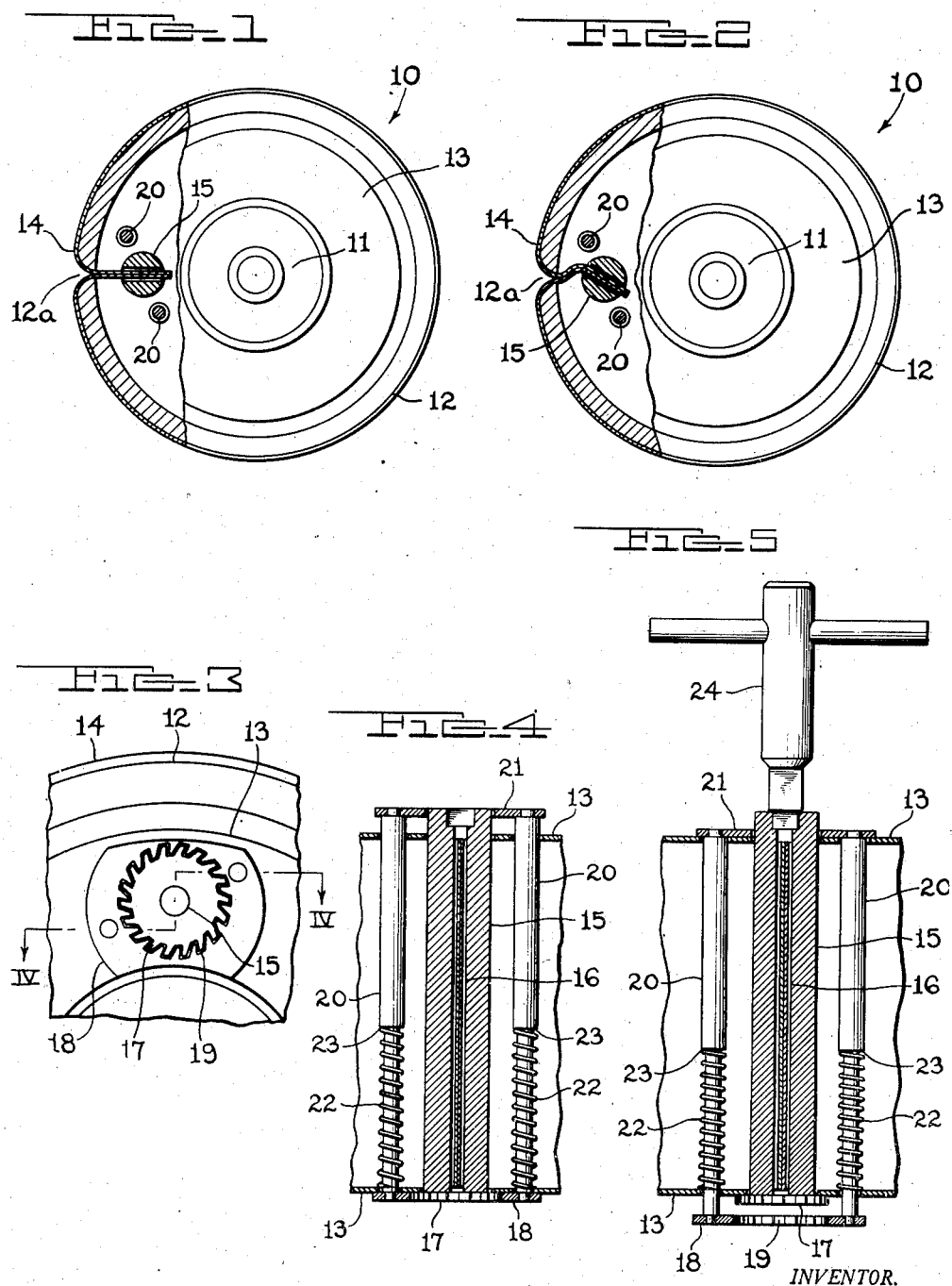
INVENTOR.
GEORGE A. SAALINGER
BY
Donald G. Dalton
ATTORNEY Patented July 5, 1949

2,475,555

UNITED STATES PATENT OFFICE 2,475,555

DEVICE FOR LOCKING THE STRIP-TIGHTENING SHAFT OF A BUFFING WHEEL OR THE LIKE

George A. Saalinger, Pittsburgh, Pa.

Application June 8, 1948, Serial No. 31,744

10 Claims. (Cl. 51—194)

This invention relates to polishing or buffing wheels having provision for removably securing a strip of surfacing material peripherally thereon and, in particular, to means for locking a tightening shaft having a slot through which the ends of the strip are passed, after limited rotation of the shaft to tension the strip and contract it about the wheel.

The strip-tightening shafts of buffing wheels have heretofore been provided with a ratchet wheel and a locking pawl cooperating therewith has been mounted on a side of the buffing wheel. It has been found, however, that the pawl is subject to considerable wear and sometimes becomes disengaged, probably because of vibration or forces incident to the rotation of the wheel at high speed. This permits the strip of surfacing material to slip or come off the wheel altogether. The object of my invention, therefore, is to provide means for more securely locking the shaft so as to hold the strip tight at all times. A further object is to provide a simple and easily operable locking means adapted to various kinds of buffing or polishing wheels.

In a preferred embodiment of my invention, I provide a frame including two pins extending through the wheel, one on each side of the shaft and connected by side plates, one on each side of the wheel. One of the plates has a hole therein shaped to make locking engagement with a holding member, such as a toothed wheel, fixed on the shaft. The frame is movable by hand to cause the locking side plate to disengage the holding member. Springs normally hold the frame in such position as to maintain locking engagement of the side plate with the holding member.

A complete understanding of the invention may be obtained from the following detailed description and explanation which refer to the accompanying drawings illustrating a present preferred embodiment. In the drawings, Figure 1 is a side elevation of a buffing wheel having the invention applied thereto with a portion broken away to show parts in section;

Figure 2 is a view similar to Figure 1 showing the slotted shaft turned to strip-tightening position;

Figure 3 is a partial side elevation showing the toothed wheel on the tightening shaft and the locking plate cooperating therewith;

Figure 4 is a partial section taken along the plane of line IV—IV of Figure 3; and Figure 5 is a view similar to Figure 4 showing the parts in an alternate position.

Referring now in detail to the drawings, a buffing wheel 10 comprises a hub 11 adapted to be mounted on any suitable driving shaft, a rim 12 and side webs 13 extending between the hub and rim. The rim 12 has a transverse slot 12ª therein adapted to receive the ends of a strip 14 of surfacing material, such as emery cloth, disposed about the periphery of the wheel. A shaft 15 extending parallel to the axis of the wheel between the hub and rim is journaled in the side webs 13 and has a longitudinal slot 16 extending transversely therethrough. The ends of the strip 14, after being inserted through the slot 12ª, are entered into the slot 16 whereupon rotation of the shaft 15 tightens the strip or band 14 snugly around the wheel.

The shaft 15 has a holding member 17 secured at one end thereof and exposed on the outside of one of the webs 13. This member may take the form of a toothed wheel, as shown in Figure 3. For cooperating with the member 17 to secure the shaft 15 in the position shown in Figure 2, I provide a locking plate 18 non-rotatably mounted on the wheel for movement axially thereof into and out of cooperative position with the wheel 17. The plate 18 has a hole 19 therein, the periphery of which is notched to conform to the teeth of wheel 17. The plate 18 is mounted on through pins 20 parallel to the shaft 15, one on each side thereof, the pins being slidable in holes in the webs 13. The ends of the pins on the side of the wheel opposite that on which the plate 18 is disposed are connected by a plate 21. The plates 18 and 21 with the pins 20 form a frame movable as a unit.

The pins 20 are turned down adjacent the ends to which the plate 18 is secured and compression springs 22 are disposed thereon between the resulting shoulders 23 intermediate the ends of the pins and the web 13 on the side on which the holding member 17 is located. Thus the springs tend to urge the pins 20 and plates 18 and 21 in a direction such as to bring the plate 18 into interlocking engagement with the wheel 17.

When it is desired to turn the shaft 15 either to tighten the strip 14 or permit replacement thereof, it is only necessary to shift the frame composed of the pins 20 and plates 18 and 21 by manual pressure on the last-mentioned plate. This shifts the parts to the positions shown in Figure 5 and permits the shaft 15 to be turned as by a key 24. When the desired adjustment of the shaft 15 has been made, the plate 18 will be restored to locking engagement with the wheel 17 when pressure on the plate 21 is released, thus permitting the springs 22 to shift the frame back to the position shown in Figure 4.

The invention is characterized by numerous advantages over prior devices for locking the strip-tightening shaft of a buffing wheel. In the first place, the plate 18 is always securely held in locking relation to the holding member or toothed wheel 17 by the springs 22 but may be easily moved by manual pressure to the disengaged position. The arrangement of the parts is such, however, that disengagement will not result from vibration or from centrifugal force or other forces incident to the rotation of the wheel at high speed. Slippage or loosening of the surfacing strip on the rim of the wheel is thus effectively prevented. The locking effect on the tightening shaft is greatly multiplied as compared to the pawl used heretofore since each tooth on the wheel engages a notch in the locking plate. This minimizes wear and greatly prolongs the useful life of the mechanism.

Although I have illustrated and described only a preferred embodiment, it will be recognized that changes in the details of the construction disclosed may be made without departing from the spirit of the invention or the scope of the appended claims.

I claim:

1. Means for locking the strip-tightening shaft of a buffing wheel or the like comprising a frame slidable in the wheel parallel to said shaft, said frame including a pair of pins, one on each side of the shaft, and a plate having a toothed hole therein adapted to receive a toothed wheel on said shaft.

2. The apparatus defined by claim 1 characterized by compression springs on said pins urging them toward the position in which the plate makes locking engagement with the holding member.

3. The apparatus defined by claim 1 characterized by said plate being on one side of the buffing wheel and said frame including a plate on the other side of the buffing wheel to facilitate shifting of the frame by manual pressure.

4. Locking means for a buffing wheel or the like having a slotted shaft rotatably mounted therein parallel to the axis and between the hub and rim for receiving the ends of a surfacing strip disposed around the wheel, said means comprising a plate overlying one end of the shaft and having a hole therein shaped to make locking engagement with a holding member fixed on said shaft, and means on the wheel holding said plate against rotation but mounting it for movement axially of the shaft into and out of locking engagement with said member.

5. The apparatus defined by claim 4 characterized by means normally urging said mounting means toward the position in which the plate makes locking engagement with the holding member.

6. The apparatus defined by claim 4 characterized by said means including a pin parallel to said shaft and slidable in said buffing wheel.

7. The apparatus defined by claim 4 characterized by a spring urging said pin toward the position in which the plate makes locking engagement with the holding member.

8. Means for locking the strip-tightening shaft of a buffing wheel or the like comprising a plate having a non-circular hole therein in axial alignment with the shaft and shaped to receive a holding member on said shaft, and a pair of pins slidable in the wheel parallel to said shaft, said plate being fixed on said pins on one side of the wheel.

9. The apparatus defined by claim 5 characterized by springs normally urging said pins toward the position in which the plate makes locking engagement with the holding member.

10. Locking means for the strip-tightening shaft of a buffing wheel comprising a frame slidable through the wheel parallel to the shaft, said frame including a plurality of pins spaced about said shaft and a pair of side plates, one on each side of the wheel, and a holding member fixed to one end of said shaft, one of said plates having a hole therein shaped to have mating engagement with said member.

GEORGE A. SAALINGER.

REFERENCES CITED

The following references are of record in the file of this patent:

UNITED STATES PATENTS

| Number | Name | Date |
|---|---|---|
| 505,683 | Stubbe | Sept. 26, 1893 |
| 863,276 | Hobby | Aug. 13, 1907 |
| 1,326,836 | Bendix | Dec. 30, 1919 |
| 1,507,603 | Helin et al. | Sept. 9, 1924 |
| 1,631,798 | Davol | June 7, 1927 |
| 2,094,999 | McLaughlin et al. | Oct. 5, 1937 |
| 2,130,409 | Aulson | Sept. 20, 1938 |

Certificate of Correction

Patent No. 2,475,555 　　　　　　　　　　　　　　　　　　　　　　　July 5, 1949

GEORGE A. SAALINGER

It is hereby certified that errors appear in the printed specification of the above numbered patent requiring correction as follows:

Column 4, line 13, claim 7, for the reference numeral "4" read *6*; line 25, claim 9, for the claim reference numeral "5" read *8*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*